March 22, 1955
D. E. WIEGAND
2,704,826
MEANS FOR USE OF AN AMPLIFIER IN
ALTERNATING CURRENT NETWORKS
Filed May 20, 1947
2 Sheets-Sheet 2
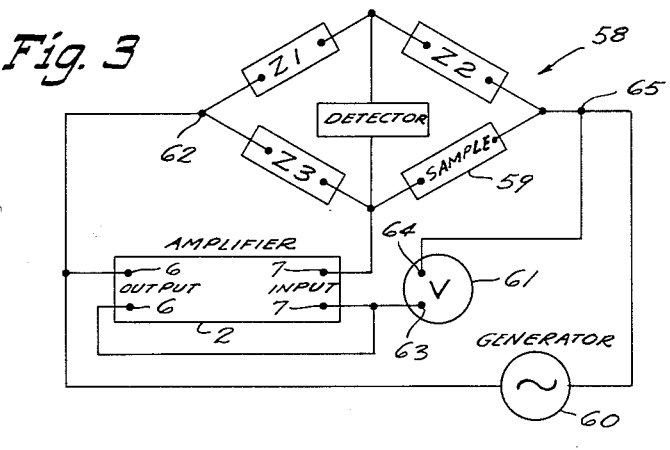
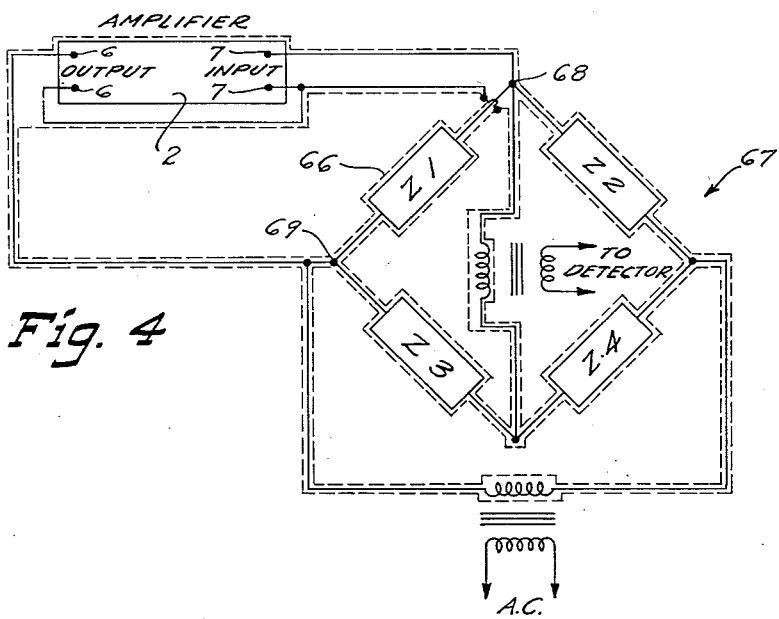
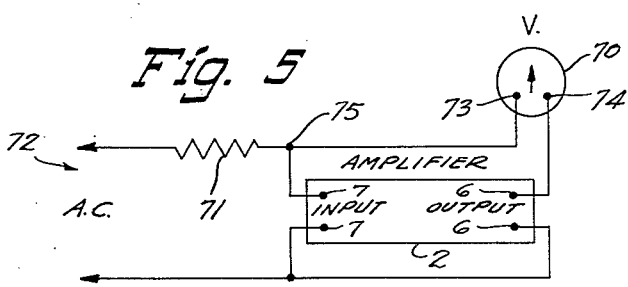
INVENTOR.
David E. Wiegand
BY
Arthur R. Woolfolk
Attorney United States Patent Office 2,704,826
Patented Mar. 22, 1955

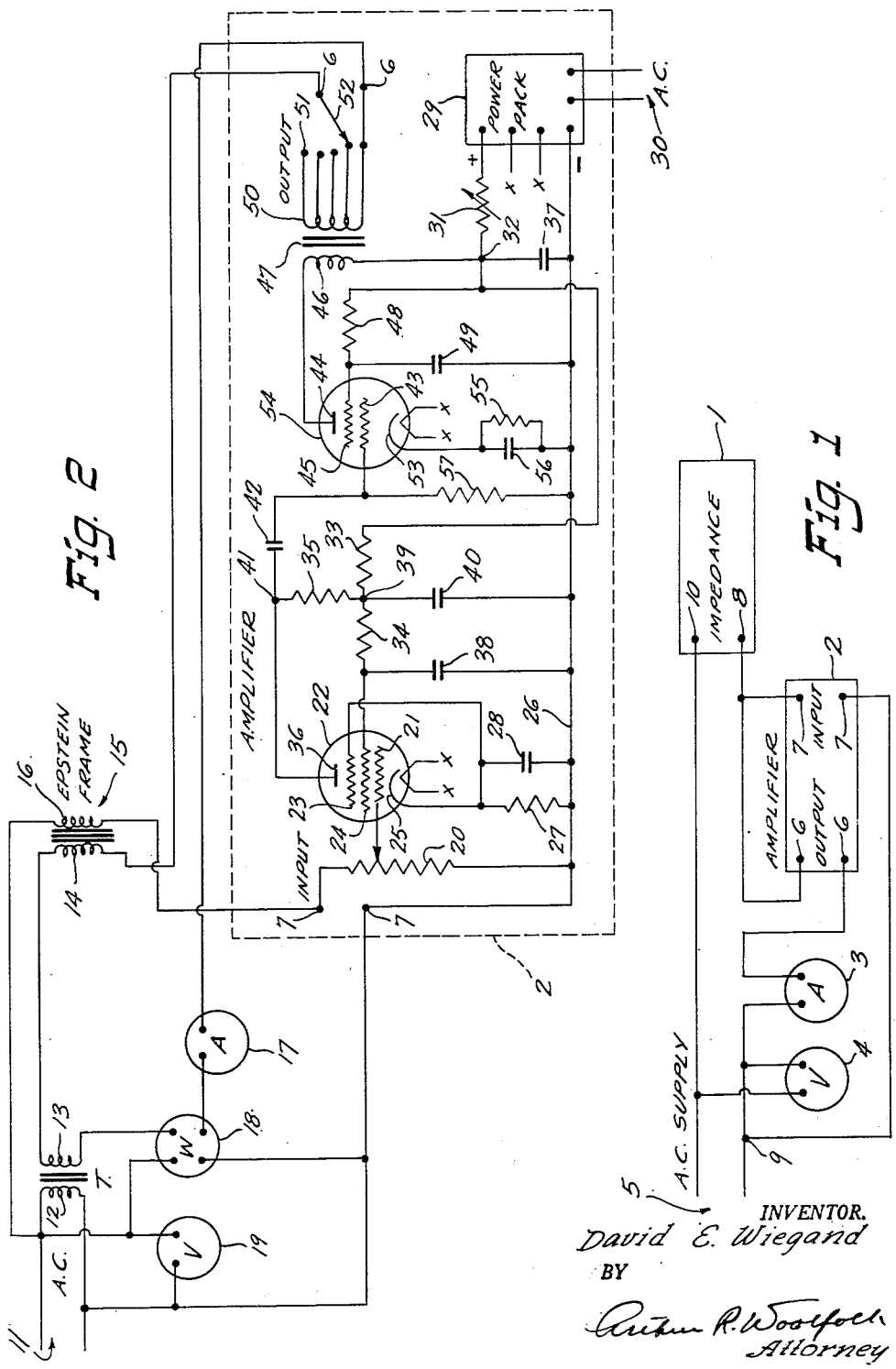

2,704,826

MEANS FOR USE OF AN AMPLIFIER IN ALTERNATING CURRENT NETWORKS

David E. Wiegand, Villa Park, Ill., assignor to McGraw Electric Company, a corporation of Delaware Application May 20, 1947, Serial No. 749,116

9 Claims. (Cl. 324—99)

This invention relates to means for the use of an amplifier in alternating current networks.

Objects of this invention are to provide a method and means for the use of an amplifier in an alternating current network to bring two points in the network to the same potential or to a predetermined difference of potential in a wholly automatic manner by the use of an amplifier whose input is controlled by the potential difference at the two points and whose output is fed into the network at such a point as to affect the difference in potential between the said two points.

More specific objects of this invention are to provide an amplifier which has a high input impedance and whose input is connected to the two points in the alternating current network, whose potential difference is to be maintained either at zero or at a predetermined value, and to so arrange the amplifier with reference to the network that no calibration of the amplifier is required and also so that ageing of the electron tubes in the amplifier or change in supply voltage or other variations of this type will not affect the accuracy of control secured by the use of the amplifier.

It is a well known fact that the conventional way of connecting instruments in an Epstein test is to connect all of the potential circuits across the secondary of the Epstein frame and excite the primary in series with the current circuits. The exciting current of the Epstein frame is far from a sine wave and has relatively strong odd harmonics in it. This complex current wave flowing through the inductance of the current circuits causes a voltage drop across the inductances in this circuit which is not a sinusoidal voltage. This non-sinusoidal voltage subtracted from the input voltage, which is usually a fairly good sine wave, gives a net voltage across the Epstein coils which is not a sine wave. This, it has been found, produces an error in the core loss measurements. Attempts have been made to keep this error as low as possible by limiting the voltage drop across the current coils of the instruments but this means the use of super-sensitive instruments. These defects increase and are especially noticeable if the sample which is being tested is small. When the error is sufficiently large, heretofore it has been necessary to make calculations to correct the core loss reading. A further defect of this usual method in an Epstein test results from the fact that the potential circuits connected across the secondary of the Epstein frame cause a loss which must be subtracted from the wattmeter reading in order to get the true core loss.

This invention is designed to overcome the above noted defects and further objects are to provide means for the use of an amplifier in an Epstein test network and to so arrange the amplifier with reference to the network that the wave form error is substantially eliminated by the amplifier action and the induced voltage in the secondary of the Epstein frame very nearly approximates the supply voltage both in magnitude, phase, and wave form, and to so arrange the system that the potential circuit burden error is eliminated.

Further objects are to provide means for Epstein testing whereby small samples may be readily tested with a very high degree of accuracy and may be tested at extremely high magnetic densities without the necessity of applying calculated corrections to the measurements.

Further objects are to provide means for impedance measurements whereby conventional voltmeters, ammeters, and wattmeters may be used, but in which the error due either to the voltage drop across the current coil of the instrument or due to the current drawn by the voltmeter or wattmeter potential circuit, depending on whether the potential circuit is placed on the source side or on the impedance side of the current coil, is eliminated.

Specifically, further objects are to provide a novel means for measuring impedance in which the true voltage across the impedance and the true current flowing through the impedance are measured.

A further specific object of this invention is to provide means for directly measuring the voltage across a sample while it is being tested in an alternating current bridge without disturbing the balance of the bridge.

A further specific object of this invention is to provide means for bringing the potential of the shield of a shielded alternating bridge to the potential of any desired point in the network of the bridge and thus to make it possible to dispense with the usual auxiliary guard circuit balance network.

Further objects are to provide means for maintaining the potential difference between any two points in an alternating current network whether it be for measurement purposes or for other purposes at zero value or any desired fixed value in a wholly automatic manner.

In alternating current instruments, such as alternating current voltmeters, what is called a "swamping" resistor is usually connected in series with the sensitive part of the instrument. This is done in order to reduce temperature and frequency errors due to changes in resistance and impedance of the sensitive elements with temperature and frequency changes. The value of this swamping resistor in relation to the resistance of the sensitive coil depends on the desired accuracy of the instrument. This makes the burden of high accuracy instruments abnormally high and in some types of instruments this high burden defeats the accuracy of the instrument.

A further specific object of this invention is to provide means for increasing the sensitivity of an alternating current measuring instrument, such as an alternating current voltmeter, whereby the voltage drop across the sensitive coils is balanced out by an equal and opposite output voltage from the amplifier and the voltage across the resistor is, therefore, substantially exactly the same as the measured voltage. The current through the resistor, therefore, depends only on the value of resistance and the applied voltage.

Further objects are to maintain the accuracy of the instrument, such as the alternating current voltmeter, without altering its calibration so that the calibration will not have to be changed with changes of resistance or impedance of the coils.

Further objects are to provide an alternating current voltmeter or other alternating current instrument associated with an alternating current amplifier in such a manner that the main part of the voltage drop is across the sensitive coils of the voltmeter so that many more turns of fine wire can be used in these coils and a lower current required for deflection of the voltmeter to thereby get a greater increase in sensitivity without sacrificing accuracy of the instrument.

Embodiments of the invention are shown in the accompanying drawings, in which:

Figure 1 is a block diagram showing the manner in which an impedance measurement is made.

Figure 2 is a diagrammatic view showing the manner in which the amplifier is used in an Epstein test.

Figure 3 is a diagrammatic view showing the manner in which the voltage across a sample being tested in an alternating current bridge may be measured without disturbing the balance of the bridge.

Figure 4 is a diagramamtic view showing the manner in which the voltage of the shield of a shielded alternating current bridge may be maintained at the same voltage as a selected point in the bridge network.

Figure 5 is a diagrammatic view showing the manner in which the amplifier may be associated with an alternating current instrument to increase its sensitivity and to correct for any changes in impedance or resistance of the sensitive coils of the instrument.

Referring to the drawings, particularly Figure 1, it will be seen that the alternating current network is so arranged that the value of an impedance may be measured. The impedance is indicated in the block diagram by the reference character 1. The amplifier, which will be described in greater detail hereinafter, is indicated by the reference character 2 and is a thermionic amplifier. An alternating current ammeter and an alternating current voltmeter are, respectively, indicated by the reference characters 3 and 4. An alternating current supply source is indicated generally by the reference character 5. It is to be noted that the voltmeter 4 is connected directly across the supply voltage and the ammeter is connected in series with the output terminals 6, 6 of the amplifier 2. The input terminals 7, 7 of the amplifier are connected, respectively, to one terminal 8 of the impedance and at a point 9 on the power supply side of the ammeter. The other terminal 10 of the impedance is connected to the other side of the alternating current supply. The amplifier is a high impedance input amplifier with a high gain and is so arranged that the voltage output from its output terminal 6 is automatically made equal and opposite to the voltage drop across the ammeter 3. Thus whatever voltage drop occurs across the ammeter, such voltage drop is compensated for and balanced out by the voltage supplied by the output of the amplifier 2. In this way the voltage reading on the voltmeter is the true voltage impressed on the impedance and the current flow in the ammeter is the true current passing through the impedance.

Figure 2 shows the system as applied to an Epstein test frame. The amplifier is indicated by the reference character 2 and the same characters 7 and 6 are used to indicate the input and output terminals thereof. The alternating current supply is indicated by the reference character 11. It is connected to the primary 12 of the transformer T. The secondary of the transformer T is indicated by the reference character 13. The secondary of the transformer has one side connected to one side of the primary 14 of the Epstein frame indicated generally by the reference character 15. The secondary of the Epstein frame is indicated by the reference character 16. The turn ratio between the primary and secondary 14 and 16 of the Epstein frame is identically the same as the turn ratio between the primary 12 and secondary 13 of the transformer T. One side of the secondary 13 is connected to one side of the primary 14. The other side of the primary 14 is connected to one of the output terminals 6 of the amplifier 2. The other output terminal of the amplifier 2 is connected through an alternating current ammeter 17 and through the current coil of a wattmeter 18 to the other side of the secondary 13 of the transformer T. The voltage coil of the wattmeter is connected across the alternating current source 11. Similarly, the alternating current voltmeter 19 is connected across the alternating current source 11. Thus the usual potential circuit burden error is eliminated in that all potential circuits of the instruments are connected directly across the alternating current supply. The wave form error is also eliminated by the amplifier action which makes the induced voltage in the secondary of the Epstein frame substantially the same as the supply voltage in magnitude, phase, and wave form. With the above described and illustrated arrangement it is possible to readily test even small samples of magnetic material at any desired density, even at very high magnetic densities, without bringing in any substantial error and without requiring any correction calculations.

The amplifier input side is a high impedance potentiometer 20 connected to the control grid 21 of a high mu tube 22. The difference in voltage between the secondary 16 of the Epstein frame and the source is impressed on the input terminals of the amplifier. Preferably the tube is supplied with a suppressor grid 23 and with a screen grid 24, the suppressor grid being connected to the cathode 25 and the cathode being connected to the negative lead 26 through a resistor 27, a suitable by-pass condenser 28 being provided. The cathode 25 is preferably indirectly heated, as shown, and the heater current as well as the high voltage for the screen and plate of the tube is furnished by a power pack 29 supplied preferably from a separate alternating current source 30. Obviously the amplifier could be supplied from a battery source or any suitable direct current source. It is also preferable to provide a variable resistor 31 in the high voltage output line from the power pack, to control the setting of the voltage at the point 32 for supplying the high voltage circuits of the amplifier. Current, as will be seen from the diagram, passes from the power pack through suitable resistor networks composed of the resistors 33, 34, and 35 to the screen 24 and plate 36 of the tube 22. It is preferable to by-pass the point 32 to the negative lead 26 by means of a condenser 37 and to provide a by-pass condenser for the screen 24 as indicated at 38 and for the point 39 of the network as indicated by the reference character 40.

It will be seen that alternating current impulses are produced at the point 41 of the amplifier and are fed through the condenser 42 to the control grid 43 of a suitable power type tube 54 which may be of any desired type, for instance a beam power tube or other suitable type of power tube. This power tube is provided with its plate 44 and a screen grid 45. Both the plate and the screen grid are fed from the point 32 through the primary 46 of an output transformer 47 and through a dropping resistor 48, respectively. It is preferable to provide a by-pass condenser 49 for the screen grid 45 of the power tube. The output transformer 47 is provided with a tapped secondary 50, any one of whose taps 51 may be connected to one of the output terminals by means of a switch 52 so that the output voltage may be selected. The cathode 53 of the power tube 54 is connected through a resistor 55 to the negative lead 26, a suitable by-pass condenser 56 being provided. Also it is to be noted that the control grid 43 of the tube 54 is connected with the negative lead 26 by means of a resistor 57.

The above detailed description of the amplifier 2 is not intended as limiting. It is merely intended to show one form of a high gain, high impedance input amplifier that may be used. It is obvious that other types of high gain, high impedance input amplifiers could be used.

It will be seen from the detailed description of Figure 2 that the amplifier compensates for the impedance drop in the transformer T in the current coil of the wattmeter 18 and in the ammeter 17. It will be seen further that the output of the amplifier produces a voltage which is equal and opposite to the voltage drop at the points indicated, and it will also be seen that the usual wave form error is eliminated by the amplifier action which makes the induced voltage in the secondary of the Epstein frame substantially the same as the supply voltage in magnitude, phase, and wave form.

It will be seen, therefore, that no correction calculation need be made and that extreme accuracy is obtained in the use of the Epstein frame, even for very small samples and for very high magnetic densities.

Referring to Figure 3 it will be seen that a method and means have been shown for directly measuring the voltage across a sample or conducting member being tested in an alternating current bridge without upsetting the balance of the bridge. The alternating current bridge is indicated generally by the reference character 58 and the sample by the reference character 59. The alternating current bridge is supplied with alternating current by means of an alternating current generator 60. The alternating current voltmeter 61 is connected in series with the input of the amplifier 2 directly across the sample 59. The output of the amplifier 2 is connected between the terminal 62 of the alternating current bridge and the terminal 63 of the alternating current voltmeter 61 and supplies a voltage equal and opposite to the voltage drop across impedance, Z3. The other terminal 64 of the alternating current voltmeter 61 is connected to the other terminal 65 of the alternating current bridge. It is apparent, therefore, that the current actually actuating the voltmeter 61 is derived from the generator and that the effect of the voltmeter 61 as a parallel path across the sample, which would disturb the bridge balance, is eliminated. The voltage across the voltmeter terminals, however, is essentially equal to the voltage across the sample or conducting member, and thus this voltage is indicated by the voltmeter.

Referring to Figure 4 it will be seen that the amplifier 2 is used to maintain the potential of the shield 66 of a shielded alternating current bridge indicated generally at 67 the same as the potential at a given point in the bridge network, for instance the point 68. In this bridge network the input of the amplifier 2 is connected between the point 68 and the shield 66 of the alternating current bridge. The output is connected at such a point in the network, for example the point 69 and to the bridge, as to maintain the potential difference between the bridge and the point 68 essentially zero.

Figure 5 shows the use of the amplifier 2 in compensating for the voltage drop across the active coils of an alternating current voltmeter 70. A noninductive resistor called the "swamping" resistor, is indicated by the reference character 71 and is connected between the alternating current source indicated generally at 72 and one terminal 73 of the alternating current voltmeter. The other terminal 74 of the alternating current voltmeter is connected to one of the output terminals 6 of the amplifier 2. The other output terminal 6 of the amplifier 2 is connected to the other side of the alternating current source. The input terminals 7 of the amplifier 2 are connected between one terminal of the alternating current source and to the terminal 75 of the resistor 71. The amplifier 2 will automatically compensate for the voltage drop across the active coils of the voltmeter 70. This arrangement reduces temperature and frequency errors due to changes in resistance and impedance of the sensitive element of the alternating current voltmeter. In this circuit shown in Figure 5, the voltage drop across the sensitive coils of the alternating current voltmeter is balanced out by the equal and opposite output voltage of the amplifier. The voltage across the resistor 71 is, therefore, the same as the measured voltage. The current through the resistor, therefore, depends only on the value of the resistance and the applied voltage. Since this same current flows through the sensitive coils of the alternating current voltmeter, the calibration of the alternating current voltmeter will not change with changes of resistance and impedance of its coils. Therefore, by following this invention it is possible to re-design alternating current voltmeters so that the main part of the voltage drop is across the sensitive coils, and thus a relatively larger number of turns of much finer wire in these coils can be used than was heretofore possible for an accurate and sensitive alternating current voltmeter. A much lower current will, therefore, be required for deflection of the meter and as a consequence it will have a greater increase of sensitivity.

It is to be noted particularly that this increase in sensitivity of the alternating current voltmeter is obtained without any sacrifice of accuracy. Instead, as shown hereinabove, the arrangement is such that substantially complete compensation is always provided.

It is to be understood that an alternating current source of supply for energizing the amplifier is employed in all forms of the invention, but this source has not been shown for the sake of clearness in the diagrammatic views of Figure 1, 3, 4, and 5. It is preferable to have this source of alternating current for the power pack a separate source. Obviously the amplifier could be supplied from a battery or other direct current source.

Although the disclosure and the description is primarily directed to alternating current measuring instruments of different kinds, nevertheless, it is apparent that the invention is not limited solely to compensating for the voltage drop due to the impedance of measuring instruments, but could be used for compensating for the voltage drop of any electrical instrumentality, which voltage drop was due to the impedance of such instrumentality.

It is to be understood that the expression "alternating current network" is intended to cover any type of alternating current system or network.

It is also to be understood that the expression "equal to" is intended to be interpreted as substantially, very closely, or approximately equal to.

It will also be understood that the expression "impedance" is intended to include impedance, whether produced by inductance, capacitance or resistance, or any combination of them.

It will be seen that this invention provides means for compensating for the voltage drop due to the impedance of an electrical instrumentality in an alternating current network by first selecting two points in the network whose voltage difference corresponds at each instant to the voltage drop across the instrumentality and generating or producing a compensating voltage in opposition to the voltage drop which, at each instant, is equal to the voltage drop and at each instant is also proportional to the voltage difference. In this way not only is the voltage drop compensated for but also the compensating voltage will have the same wave form as that of the voltage drop. It is to be noted also that by using a high gain, high impedance input amplifier that the network is substantially undisturbed although the difference between the compensated voltage and the compensating voltage is utilized to control the amplifier.

It is to be noted that the amplified voltage is in reality a compensating voltage. It is injected into the network or system at a suitable point and in a direction opposite that of the voltage drop which it is desired to compensate. The difference in voltage between the voltage drop and the amplified voltage or compensating voltage is used to control the amplifier.

The expression "voltage drop" is intended to mean the equivalent voltage which opposes the voltage of the source due to the impedance of the instrument or device and its direction or sense is opposed to the direction or sense of the voltage of the source. It is this voltage drop which is opposed or compensated for by the injected amplified voltage.

Although this invention has been described in considerable detail, it is to be understood that such description is intended as illustrative rather than limiting, as the invention may be variously embodied and is to be interpreted as claimed.

I claim:

1. In an alternating current network, a source of alternating current, an alternating current electrical instrumentality energized from said source, said electrical instrumentality producing an alternating current voltage drop, a thermionic amplifier responsive to said voltage drop arranged to produce an alternating current output voltage equal to said alternating current voltage drop and free from abrupt variations and in series relation to said electrical instrumentality to thereby counteract the voltage drop due to said electrical instrumentality.

2. The combination of an Epstein frame for testing magnetic samples including a primary and a secondary, a source of alternating current for energizing said primary, at least one measuring instrument having a current coil, and a high input impedance amplifier having its input connected in series with the secondary of said Epstein frame and arranged so that the induced voltage in the secondary is opposed by a voltage derived from said source of alternating current and with the output of said amplifier connected in series relation with the primary of said Epstein frame and the current coil of said measuring instrument and arranged to produce a voltage in opposition to the voltage drop across the current coil of said measuring instrument.

3. The combination of an Epstein frame for testing a magnetic sample including a primary and a secondary, a source of alternating current for energizing said primary, at least one measuring instrument having a current coil, and a high input impedance amplifier having its input connected in series with said secondary and across the source with the induced voltage in said secondary opposing the voltage of said source, said amplifier having its output connected in series relation with said primary and said current coil and arranged so that its output voltage is opposite to the voltage drop across said current coil.

4. The combination of an Epstein frame for testing magnetic samples including a primary and a secondary, a source of alternating current, a transformer having its primary connected to said source and having a secondary, the turns ratio of said Epstein frame and said transformer being equal, measuring instruments having current coils connected in series with the secondary of said transformer and the primary of said Epstein frame, and a high input impedance amplifier having its input connected in series with the secondary of said Epstein frame and across said source with the induced voltage in the secondary of said Epstein frame opposing the voltage of said source and with the output of said amplifier connected in series with the current coils of said instruments and the primary of the Epstein frame and the secondary of the transformer and arranged to produce a voltage equal to and in the opposite direction to the voltage drop produced jointly by the impedance of the current coils and of the transformer.

5. A system for measuring impedance comprising a source of alternating current connected across the impedance, an ammeter connected in series with the impedance, a voltmeter connected across the source ahead of said ammeter, a high input impedance amplifier arranged to produce an amplified alternating current voltage and having its input arranged to have the difference between the voltage drop due to the impedance of said ammeter and the amplified voltage impressed thereon and having its output connected in series with said ammeter and arranged to produce an alternating current voltage in a direction opposite that of the voltage drop across said ammeter and free from abrupt variations and of a magnitude equal to said voltage drop to compensate for the voltage drop across said ammeter.

6. An alternating current bridge having end terminals and side terminals, a conducting member connected between a side terminal and an end terminal, a source of alternating current connected to the end terminals, a voltmeter, a high input impedance amplifier having its input connected in series with said voltmeter across said conducting member and having its output connected in series with said source and said voltmeter and arranged to produce an alternating current voltage in a direction opposite to the difference between the voltage of the source and the voltage across the conducting member and of a value equal to said voltage difference and free from abrupt variations, whereby the voltage across said conducting member can be measured without disturbing the balance of said bridge.

7. In an alternating current network, a source of alternating current, an alternating current measuring instrument having a sensitive element, a high gain, high impedance input amplifier, a non-inductive resistor connected in series with said element and with the output of said amplifier and across said source, said amplifier having its input controlled by the difference between the voltage of the source and the voltage across said resistor and arranged to produce an alternating current amplified voltage equal and opposite to the voltage drop across said sensitive element and free from abrupt variations, whereby the voltage drop across said sensitive element is neutralized.

8. In an alternating current network, a source of alternating current, an alternating current measuring instrument having a sensitive element, a non-inductive resistor connected in series with said element across said source, and an electronic high gain, high input impedance amplifier arranged to produce an alternating current amplified voltage at its output and having its output connected in series with said sensitive element with the direction and value of the amplified voltage opposite and equal that of the voltage drop across said sensitive element and free from abrupt variations, said amplifier having its input controlled by the difference between said voltage of the source and the voltage across said resistor whereby the voltage drop across said sensitive element is neutralized.

9. In an alternating current network, a source of alternating current, an alternating current measuring instrument having a sensitive element, a non-inductive resistor connected in series with said element across said source, and an electronic high gain, high input impedance amplifier having its input controlled by the difference between the voltage of the source and the voltage across the resistor and arranged to produce an alternating current amplified voltage at its output and having its output connected in series with said sensitive element with the direction of the amplified voltage opposite and equal that of the voltage drop across said sensitive element and free from abrupt variations, said amplifier being arranged to produce an amplified voltage which at each instant is equal and opposite the voltage drop across said sensitive element whereby the voltage drop across said sensitive element is neutralized.

References Cited in the file of this patent

UNITED STATES PATENTS

| | | |
|---|---|---|
| 1,520,994 | Arnold | Dec. 30, 1924 |
| 2,239,768 | Artzt | Apr. 29, 1941 |
| 2,351,079 | Strobel | June 13, 1944 |
| 2,368,351 | Ewen | Jan. 30, 1945 |
| 2,421,560 | Haynes | June 3, 1947 |
| 2,459,730 | Williams | Jan. 18, 1949 |
| 2,490,579 | Clewell | Dec. 6, 1949 |